United States Patent
Mueller et al.

(10) Patent No.: US 12,110,955 B2
(45) Date of Patent: Oct. 8, 2024

(54) DECOUPLING RING FOR A PLANETARY GEAR

(71) Applicant: Vibracoustic SE, Darmstadt (DE)

(72) Inventors: Niklas Mueller, Ihringen (DE); Markus Duerre, Neuenburg am Rhein (DE)

(73) Assignee: Vibracoustic SE, Darmstadt (DE)

( * ) Notice: Subject to any disclaimer, the term of this patent is extended or adjusted under 35 U.S.C. 154(b) by 54 days.

(21) Appl. No.: 17/536,246

(22) Filed: Nov. 29, 2021

(65) Prior Publication Data

US 2022/0170541 A1    Jun. 2, 2022

(30) Foreign Application Priority Data

Dec. 2, 2020  (DE) .......................... 102020131974.6

(51) Int. Cl.
*F16H 55/17*    (2006.01)
*F16H 55/06*    (2006.01)

(52) U.S. Cl.
CPC ............ *F16H 55/17* (2013.01); *F16H 55/06* (2013.01); *F16H 2055/065* (2013.01); *F16H 2055/176* (2013.01)

(58) Field of Classification Search
CPC .... F16H 2055/176; F16H 55/06; F16H 55/17; F16H 2055/065
See application file for complete search history.

(56) References Cited

U.S. PATENT DOCUMENTS

| | | | | |
|---|---|---|---|---|
| 4,715,243 A | * | 12/1987 | Morishita | ............... F16H 55/06 74/DIG. 10 |
| 5,127,279 A | | 7/1992 | Barthruff | |
| 5,324,182 A | | 6/1994 | Sabet et al. | |
| 2010/0292043 A1 | * | 11/2010 | Tao | ...................... F16H 57/028 475/344 |

FOREIGN PATENT DOCUMENTS

| | | |
|---|---|---|
| DE | 3821023 A1 | 12/1989 |
| DE | 102011075916 A1 | 11/2012 |
| DE | 102018107207 A1 | 10/2019 |
| JP | 2009168142 A | 7/2009 |

OTHER PUBLICATIONS

Translation of DE102011075916A1.*
Translation JP2009168142, 2009.*
International Search Report, 21205933.1, dated Mar. 25, 2022.
Korean Office Action, KR 10-2021-0167333, dated Jun. 19, 2023 (w_English_translation).
German Office Action, DE102020131974.6, dated Jul. 6, 2021.
Machine translation of German Office Action, DE102020131974.6, dated Jul. 6, 2021.
EP Examination Report, EP21 205 933.1, dated Oct. 24, 2023 (w_English_translation).

* cited by examiner

*Primary Examiner* — Terence Boes
(74) *Attorney, Agent, or Firm* — Fishman Stewart PLLC (57) ABSTRACT

A decoupling ring suitable for a planetary gear is disclosed. A decoupling ring includes an annular elastomeric base body and elastomeric formations. In embodiments, the elastomeric formations are uniformly spaced apart from one another, project in the radial direction from the base body, and run parallel to a central longitudinal axis passing centrally through the decoupling ring. With embodiments of the decoupling ring it is possible for the decoupling ring to be (Continued)

arranged on the circumferential side of a ring gear of a planetary gear.

15 Claims, 4 Drawing Sheets

DECOUPLING RING FOR A PLANETARY GEAR

CROSS-REFERENCE TO RELATED APPLICATIONS

This application claims priority to German Patent Application No. DE 10 2020 131 974.6, filed Dec. 2, 2020, the contents of which are hereby incorporated by reference in its entirety.

TECHNICAL FIELD

The invention concerns a decoupling ring, an assembly with certain features, and a planetary gear.

BACKGROUND

Planetary gear units may have acoustic disadvantages due to their design. These can be attributed to various causes. One cause can be vibrations caused by the meshing of the planetary gears with the ring gear and/or the sun gear. These vibrations are introduced by the ring gear into the gear housing, which in turn emits airborne noise that can be perceived as unpleasant or even disturbing. The vibrations that are introduced into the housing can also be noticeable in the form of structure-borne noise. The rotation of the planetary gears creates a third-order excitation on the ring gear, which also introduces vibrations into the housing. The gear housing, which may be made of aluminum, regularly has very low damping and is excited to vibrate by this excitation. These vibrations can also be reflected in audible airborne noise. These problems may occur in particular with the type of planetary gear unit with a fixed ring gear.

The current state of the art solves this problem by using additional damping material surrounding the gear housing. So far, it is not the vibration as the cause of airborne noise that is prevented, but the perception of airborne noise. This solution is often referred to as NVH cover (Noise, Vibration, Harshness) and is disadvantageous in this context for various reasons. In addition to the high additional costs for such insulation, a corresponding installation space must be provided. In addition, this acoustic insulation measure is also a thermal insulation, which is highly disadvantageous in the context of gearboxes. For example, the insulation prevents or hinders the necessary heat radiation. As a result, the cooling capacity of a machine cooling the transmission must be increased, which leads to higher energy consumption and/or more efficient cooling machines.

SUMMARY

The invention involves the task of creating a means of preventing vibrations that lead to the generation of airborne noise, especially in planetary gear units.

Main features of the invention are disclosed herein, along with several embodiments.

According to embodiments of the invention, a decoupling ring for a planetary gear is proposed, comprising an annular elastomeric base body and elastomeric formations which are uniformly spaced apart from one another, project radially from the base body and run parallel to a central longitudinal axis passing centrally through the decoupling ring, it being possible for the decoupling ring to be arranged on the circumferential side of a ring gear of a planetary gear.

In brief, the present invention can be used to interrupt the relevant vibration transfer path between two components. These components can be, for example, in the context of a planetary gearbox, a ring gear and a gearbox housing. Due to the elasticity of the elastomer in combination with the material damping of the elastomer, the unwanted vibrations can be reduced on the one hand and their transfer to the other component or further components can be prevented on the other hand. In addition to the improvement in NVH behavior, it is possible to dispense with the NVH cover described above. This also makes cooling the gearbox considerably simpler, more cost-effective and more resource-efficient.

By means of the decoupling ring, two components, such as an internal gear and a housing, can be decoupled from each other in at least one spatial direction, but preferably in all spatial directions (torsional, axial, radial). Moreover, there is no metallic contact between two metallic components via the elastomer, so that the transmission of structure-borne sound is optimally interrupted by the vibration-blocking elastomer. This means that the phenomenon known as "ringing through" cannot occur.

In the context of the planetary gear, the invention also leads to the possibility of a ring gear that is easier to design and can have less dimensional accuracy due to the arrangement of the decoupling ring on the circumferential side, since the elastomer can compensate for deviations.

The moldings can project inwards and/or outwards in the radial direction and provide support on the inner and/or outer circumference. The stiffness of the decoupling ring can be adjusted via the length of the radial extension of the protrusions, whereby a small radial extension leads to a soft decoupling ring and a stiff decoupling ring can be realized by means of a large radial extension.

The moldings can be separate parts of the main body and firmly connected to it, or they can be made of the same material as the main body and in one piece.

According to a further development of the decoupling ring, the elastomeric moldings can have at least one press-fit surface via which they can press-fit against a component, such as a housing or an internal gear. Via the press-fit surfaces, the elastomeric moldings and possibly the base body can be prestressed by a component resting against them. Advantageously, each molding comprises two press-fit surfaces. It is feasible that one of these press-fit surfaces is arranged on each side of a longitudinal center plane, preferably mirror-symmetrically thereto. The press-fit surfaces can have a flat or curved cross-sectional profile.

According to a further development of the decoupling ring, the at least one press-fit surface can be tilted at an angle relative to a longitudinal center plane of the decoupling ring. The longitudinal center plane also contains the longitudinal center axis. The longitudinal center plane can centrally pass through a molding. Compared to a press-fit surface lying in the longitudinal center plane, such a tilt allows a larger elastomer surface of the molding to serve as a press-fit surface. In addition, this considerably simplifies the manufacturability of the adjacent component, because the angle enclosed by the mating surfaces of the component can thus be considerably greater than 90°.

According to a further development of the decoupling ring, the base body and/or the moldings can have at least one free surface which, in the assembled state, delimits a cavity at least in sections. The assembly state is the position in which the decoupling ring is arranged on at least one component. No other component is in contact with the free surface in the assembled state. The contour of the base body and/or of the formed parts can be designed in such a way that, in a load-free state or assembly state, cavities are present relative to the adjacent component, into which the elastomer of the base body and/or of the formed parts can be pressed under load. On one hand, this provides flexibility, and on the other hand, it generates a progressive profile. As soon as the cavity is filled with elastomer, the stiffness increases. In this way, a smooth characteristic can be generated at low loads, and at high loads the torsion angle is limited, thus protecting the component or components from overload. Additionally or alternatively, the components, such as the ring gear and/or the housing, can also be designed to generate cavities. A mating surface can, for example, be recessed relative to a position adjacent to the free surface in order to create a distance therefrom. The same applies analogously either additionally or alternatively to the corresponding free surface. In the assembled state, the cavity can be formed between the decoupling ring and a component abutting it at least in sections. Free surfaces can be formed, for example, between adjacent moldings and on a molding head. The flanks of the molded part can also comprise a free area, at least in sections.

According to a further development of the decoupling ring, the formations can have a cross-sectional outer contour of an elongated hexagon. The hexagon can be stretched in the circumferential direction. This allows the two short sides of the hexagon facing in the circumferential direction to fulfill different functions. One of the short sides may have or form the press-fit surface tilted relative to the longitudinal center plane. The other of the two short sides can form an undercut which can enlarge the cavity. This short side can form a fillet with the base body, for example, and/or enclose an angle which is at most 90°, but is preferably in the range from 90° to 80°, more preferably 85°. The Long free side of the hexagon can form and/or comprise the free surface and/or form and/or comprise a forming head surface of the forming head.

According to a further development of the decoupling ring, the base body and/or the formations can have at least one stop buffer, the stop buffer preferably being arranged on a free surface or comprising a free surface. A stop buffer can be an elastomer section that is thickened relative to an immediately adjacent section. The stop buffer can be of uniform material and/or formed integrally with the base body or the formations. Alternatively, the stop buffer can also form the free surface itself. It is conceivable that the moldings have several stop buffers. It is also possible that at least one stop buffer is assigned to each cavity. A stop buffer can be arranged in such a way that it buffers in the radial direction as a radial stop buffer or in the axial direction as an axial stop buffer. In the latter variant, for example, a molded part can have at least one stop buffer extending in the longitudinal direction and arranged on its end face. This axial stop buffer also serves to provide isolation, since the ring gear can be secured axially on both sides. If the end faces were metallic, for example, there would be no elastomeric interruption of the sound path.

According to a further development of the decoupling ring, it can comprise a carrier ring on the inner or outer circumference, on which the elastomeric base body with the formations is arranged, preferably vulcanized. The carrier ring serves to ensure the dimensional stability of the isolating ring, in particular during assembly, and increases its rigidity. The carrier ring can have the elastomeric base body on only one of its two sides facing in the radial direction, the other side being free or elastomer-free. The carrier ring can be pressed to a component via this free side. The carrier ring is made of a metal, preferably an aluminum alloy or a steel sheet, or of a plastic. As an alternative to vulcanization, at least the base body can be manufactured separately from the carrier ring and then arranged on the latter by means of a frictional and/or positive connection.

According to a further development of the decoupling ring, the carrier ring can comprise outer-circumferential or inner-circumferential core teeth and/or inner-circumferential or outer-circumferential carrier teeth, the quantitative ratio of the number of core teeth to the number of carrier teeth preferably being 1:2. Two carrier teeth can therefore be assigned to each core tooth. The core teeth may be arranged projecting to one side of the carrier ring and the carrier teeth may be arranged projecting to the other side. The teeth may project from a base body of the carrier ring in a radial direction. For example, the teeth may have the cross-sectional contour of a triangle, a rectangle, or a trapezoid. The teeth may also have press-fit ridges extending in the longitudinal direction. Preferably, only the carrier teeth have such interference fit ridges. The pressfit ridges prevent a disadvantageous full-surface contact during a press-fit connection to a component. The carrier ring can be pressed onto a component via the carrier teeth. The teeth, and in particular the carrier teeth, are used for engagement in a correspondingly shaped mating geometry and can thus transmit large and varying torques, which is particularly advantageous for planetary gears with a non-stationary ring gear.

According to a further development of the decoupling ring, an imaginary extension line of the core tooth flank of each core tooth can run through a corresponding carrier tooth. In the case of a flat core tooth flank, this imaginary extension line is a straight line, i.e. a lengthening line. In the case of a curved core tooth flank, the extension line is a curve, or an extension curve. Such a design improves the stability of the carrier ring and prevents bottlenecks in the carrier ring for a force flow.

According to a further development of the decoupling ring, each core tooth can form the core of a more elastomeric formation. The formation thus surrounds the core tooth at least in sections and covers it there. Preferably, the core tooth and the shaping are centered on each other in the circumferential direction and/or longitudinal direction. The core tooth increases the sturdiness of each shaping. In addition, further advantages can be generated by structurally matching the pairing of shaping/core tooth. For example, the core tooth can be trapezoidal in cross-section and the shaping hexagonal in cross-section. In this case, a large amount of elastomer can be arranged above the core tooth flank in the normal direction of the core tooth flank in order to create a large cushion there. However, the hexagonal shape also allows a space or cavity to be formed into which the elastomer can be forced in the assembled or loaded state. The elastomeric shaping can be trapezoidal in sections and/or extend from the core tooth flank.

According to a further development of the decoupling ring, an elastomer thickness over a core tooth tip surface can be smaller than over a core tooth flank. The normal direction of the core tooth tip surface and the core tooth flank is relevant here. The elastomer can form a free surface on the core tooth tip surface. It is conceivable to conduct forces only via the core tooth flanks and to remove the core tooth tip from the force flow. The elastomer thickness can then be reduced accordingly and the possibility of forming a cavity can be provided.

According to a further development of the decoupling ring, the carrier ring and/or the base body can be designed in several pieces. The individual parts can be assembled before or during assembly. This saves space in the vulcanization mold, allowing the number of cavities to be increased.

This advantage also applies equally to transport, as they can be arranged in a more space-saving manner.

According to embodiments of the invention, an assembly for a planetary gear is also proposed, comprising a decoupling ring according to the disclosure and a ring gear of a planetary gear, wherein the decoupling ring is arranged on the circumferential side of the ring gear, and/or a gear housing, wherein the decoupling ring can be arranged on the inner circumference of the gear housing. The advantages already described above with regard to the decoupling ring result analogously for the assembly, to which reference is hereby made.

According to a further development of the assembly, the decoupling ring can be vulcanized directly onto the ring gear, arranged as a separate element on the ring gear by means of frictional and/or positive locking, or pressed onto the ring gear via the carrier ring. The first two variants do not require an additional carrier ring. The elastomer can be designed in such a way that only sections of the ring gear are encased in elastomer. The assembly can then be pressed into a housing or gear housing surrounding the outer circumference of the assembly, where it is held frictionally against a corresponding mating contour by an elastomer overlap.

Alternatively, the decoupling ring can be vulcanized directly into the housing, arranged as a separate element in the housing by means of frictional and/or positive locking, or pressed to the housing via the carrier ring. The first two variants do not require an additional carrier ring. The elastomer can be designed in such a way that only sections of the housing are encased in elastomer by a material bond. The assembly can then be pressed onto an internal gear and held there by an elastomer overlap on a corresponding mating contour.

According to embodiments of the invention, a planetary gear is further proposed comprising a decoupling ring according to teachings of the invention, a ring gear and a gear housing, wherein the decoupling ring can be arranged between the ring gear and the gear housing surrounding the ring gear on the outer circumferential side. The planetary gear may be of the fixed ring gear type. The decoupling ring advantageously connects and decouples both components from each other. The advantages already described above with regard to the decoupling ring also apply analogously to the planetary gear, to which reference is hereby made.

According to a further development of the planetary gear, the number of formations may be an integer multiple of the number of planetary gears. The planetary gear according to embodiments of the invention can comprise planet wheels. This leads advantageously to the fact that all planet wheels are supported identically in each position, whereby a smooth running is supported and vibrations are avoided.

BRIEF DESCRIPTION OF THE DRAWINGS

Further features, details and advantages of the invention are apparent from the wording of the claims and from the following description of embodiments based on the figures in the drawings. Showing:

In the figures, identical or corresponding elements are designated with the same reference signs and are therefore not described again unless appropriate. Features already described are not described again to avoid repetition and are applicable to all elements with the same or corresponding reference signs, unless explicitly excluded. The disclosures contained in the entire description are applicable mutatis mutandis to identical parts with identical reference signs or identical component designations. Also, the positional indications selected in the description, such as top, bottom, side, etc., are related to the directly described as well as depicted figure and are to be transferred mutatis mutandis to the new position in the event of a change of position. Furthermore, individual features or combinations of features from the different embodiment examples shown and described can also represent independent, inventive solutions or solutions according to embodiments of the invention.

DETAILED DESCRIPTION

Figure 1:
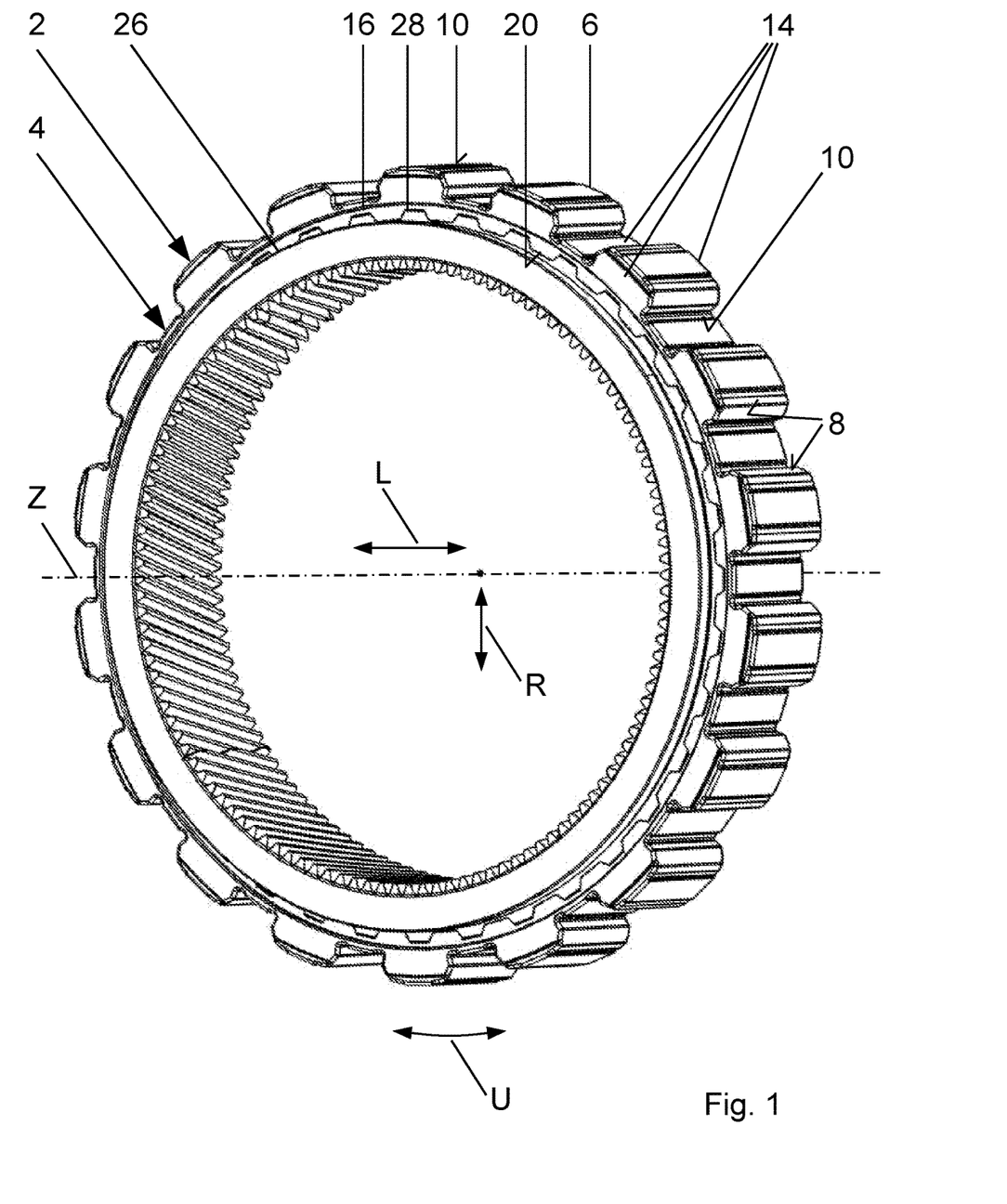
FIG. 1 a perspective view of an assembly according to an embodiment of the invention, FIG. 2 a perspective view of a decoupling ring according to an embodiment of the invention as shown in FIG. 1, FIG. 3 a detailed view of the decoupling ring according to FIG. 2, FIG. 4 a detailed view of a planetary gear having a decoupling ring of a second embodiment, and FIG. 5 a detailed view of a planetary gear with a decoupling ring of a third embodiment.

FIG. 1 shows an embodiment of an assembly according to an embodiment of the invention, comprising a ring gear 26 of a planetary gear and a decoupling ring 2. The ring gear 26 has teeth on the inner circumference in a known manner for meshing engagement with planetary gears of the planetary gear which are not shown. On the outer circumference, the ring gear 26 has base teeth 28 evenly spaced in the circumferential direction U. The ring gear 26 or the assembly is traversed by a central longitudinal axis Z in the longitudinal direction L.

Figure 2:
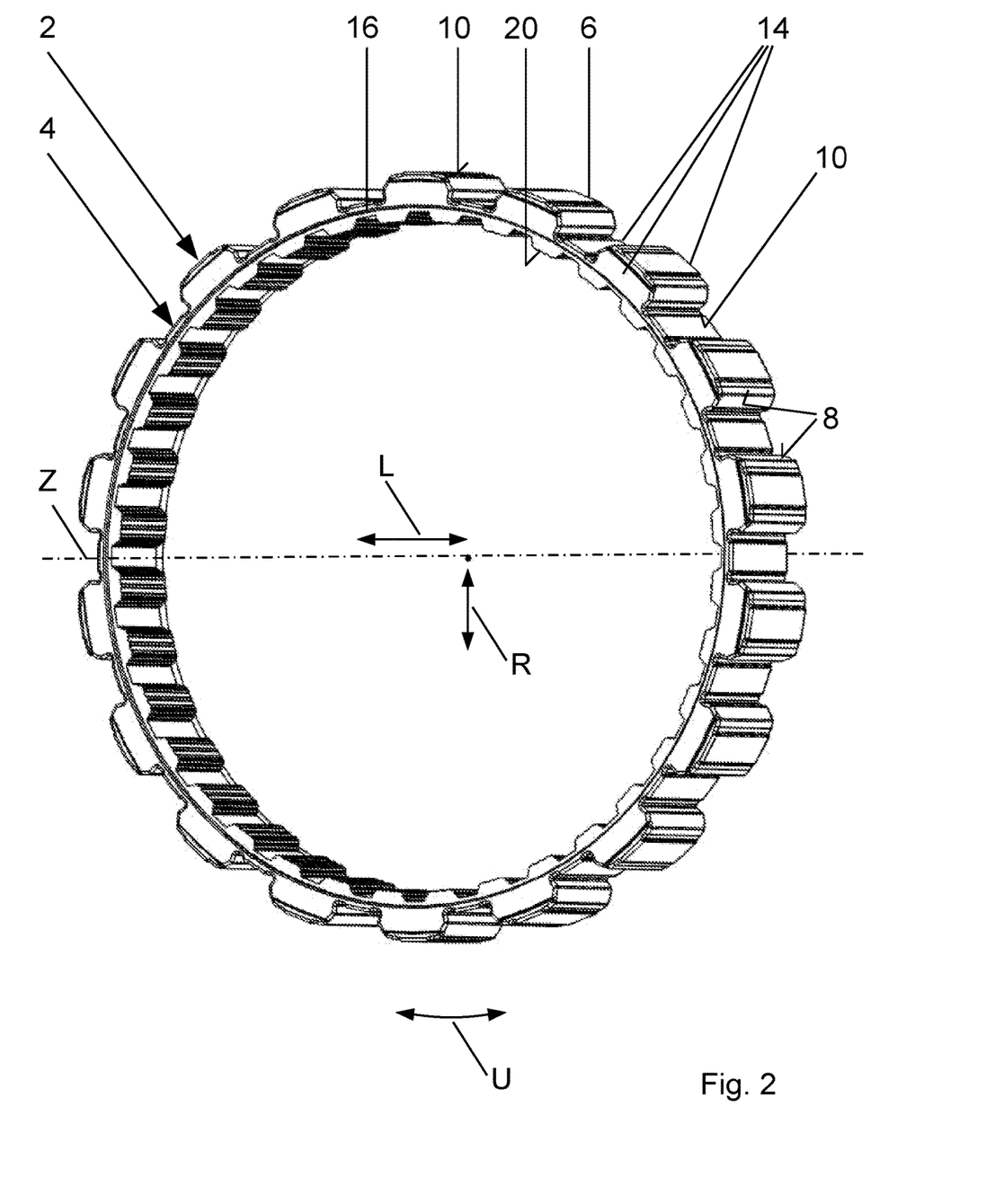

The decoupling ring 2 is arranged on the circumference of the ring gear 26. In the first embodiment shown, it comprises an elastomeric base body 4 and elastomeric formations 6 projecting outwards therefrom in the radial direction R and spaced uniformly apart from one another, which run parallel to the central longitudinal axis Z. The elastomeric formations 6 are made of an aluminum alloy. The decoupling ring 2 also comprises a carrier ring 16 made of an aluminum alloy. As FIG. 2 shows with the ring gear 26 blanked out, the carrier ring 16 has carrier teeth 20 spaced uniformly in the circumferential direction U on the inner circumferential side. The carrier teeth 20 of the carrier ring 16 and the base teeth 28 of the ring gear 26 are in mutual engagement, the decoupling ring 2 being pressed to the ring gear 26 via the carrier ring 16.

Figure 3:
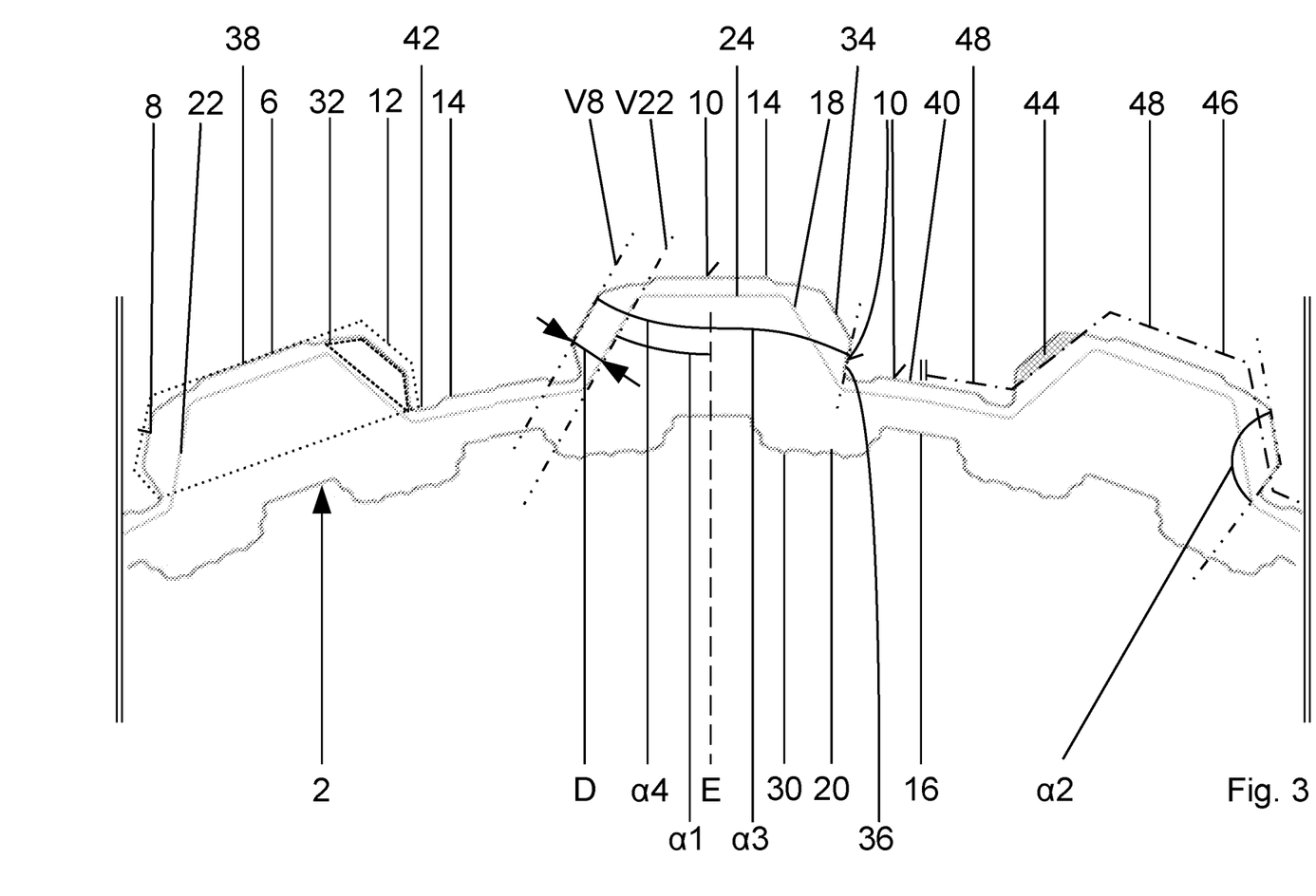

As FIG. 3 shows in detail, the carrier ring 16 has evenly spaced core teeth 18 on the outer circumference in the circumferential direction U. Since two carrier teeth 20 are assigned to each core tooth 18, their quantity ratio is 1:2. Since two carrier teeth 20 are assigned to each core tooth 18, their ratio is 1:2. The core teeth 18 and carrier teeth 20 project in different radial directions R. The core teeth 18 and carrier teeth 20 have the transverse contour of a trapezoid with a long side on the carrier ring 16. The carrier teeth 20 have press-fit ridges 30 extending in the longitudinal direction L. Three press-fit ridges 30 are provided on the head side and two press-fit ridges 30 are provided on each of the flanks. The decoupling ring 2 can be pressed onto the ring gear 26 via the press-fit ridges 30. An imaginary extension line V22 of a core tooth flank 22 of the core tooth 18 runs through a corresponding carrier tooth 20, preferably between its flank and tip side. The core tooth flanks 22 are tilted by an angle $\alpha 1$ with respect to a longitudinal center plane E, in which the central longitudinal axis Z lies and which passes centrally through the molding 6. The angle $\alpha 1$ may be in the range of 10° to 50°, preferably between 20° and 40°, more preferably it may be 30°. The angle α1 spans positively between the longitudinal center plane E and the extension line V22.

FIG. 3 also shows a cross-section through the decoupling ring 2 with three identical shaped parts 6, whereby the elastomeric base body 4 is vulcanized with the shaped parts 6 onto the carrier ring 16. The carrier ring 16 is thus completely elastomer-covered on the outer circumference. Each core tooth 18 forms the core of an elastomeric shaping 6, with both being centered relative to one another in the circumferential direction U and longitudinal direction L. Each core tooth 18 has the outer contour of a symmetrical trapezoid, and each shaping 6 has the outer contour of an elongated hexagon 12, shown here as a dotted line. It can also be seen that in sections above a core tooth flank 22 in each case, the protrusion 6 has the cross-sectional shape of a trapezoid 32, shown here as a short line. This allows a large amount of elastomer to be arranged in the normal direction above the core tooth flank 22, which is denoted here by the thickness D. In addition, the elastomer thickness above a core tooth tip surface 24 is smaller than above a core tooth flank 22.

Each trapezoid 12 has two short sides to its two sides, denoted first short side 34 and second short side 36. These sides 34, 36 form the flanks of each formation 6. Both sides 34, 36 may include with each other an angle α2 in the range of 175° to 90°, preferably in the range of 150° to 120°, being 135° in the present example. Advantageously, the second short side 36 includes with the longitudinal median plane E a negative angle α3. The second short side 36 therefore forms an undercut. The first short side 34 includes a positive angle α4 with the longitudinal center plane E. The angle α4 may be in the range of 10° to 50°, preferably between 20° and 40°, more preferably it may be 30°. The first short sides 34 of a shaping 6 delimit a forming head surface 38 of a shaping head. The second short sides 36 of adjacent moldings 6 delimit an intermediate surface 40 of the base body 4. Each second short side 36 merges into the intermediate surface 40 via a fillet 42.

It can be seen that each forming head surface 38 and each intermediate surface 40 has a stop buffer 14. Thus, base body 4 and moldings 6 comprise stop buffers 14. These radial stop buffers buffer in the radial direction R. Further stop buffers 14 are shown in FIG. 1. These axial stop buffers are arranged at least on one end face of the moldings 6 and buffer axially in the longitudinal direction L. It is also visible that the stop buffers 14 are formed as an elastomer section that is thicker than an immediately adjacent section.

Each formation 6 has two press-fit surfaces 8. These press-fit surfaces 8 coincide with the first short sides 34. Each press-fit surface 8 is designed to be prestressed in the assembled state by a mating geometry in contact therewith. An elastomer cover 44 serves this purpose. In FIG. 3, a housing or gear housing 46 in the assembled state is indicated by a dotted line on the right-hand projection 6 in the image plane. The gear housing 46 forms a mating geometry with a mating surface and lies exclusively against the press-fit surfaces 8. The press-fit surfaces 8 are tilted relative to the longitudinal center plane E by the angle α4. The angle α4 spans in a positive manner between the longitudinal center plane E and an extension line V8 of the press-fit surface 8. V8 and V22 can run parallel.

In addition to the press-fit surfaces 8, the decoupling ring 2 also has clearance surfaces 10. No mating geometry is applied to the clearance surfaces 10 in the assembled state. A clearance surface 10 coincides here with the forming head surface 38, a clearance surface 10 coincides with the intermediate surface 40 and a clearance surface 10 coincides with the second short side 36. The clearance surfaces 10 each define a cavity 48 with the mating geometry, and the negative angle α3 allows the cavity 48 to be formed large between adjacent moldings 6.

Figure 4:
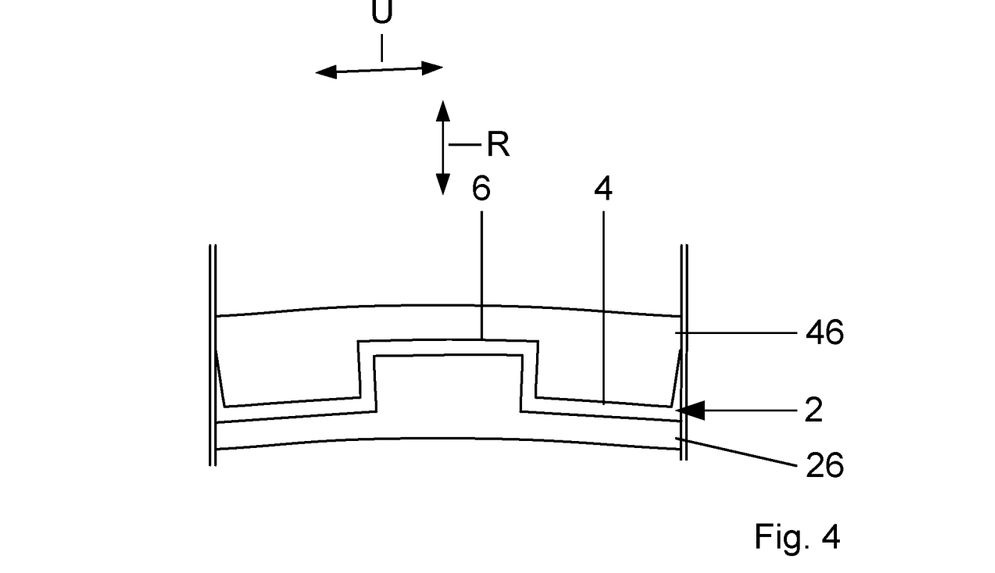
Figure 5:
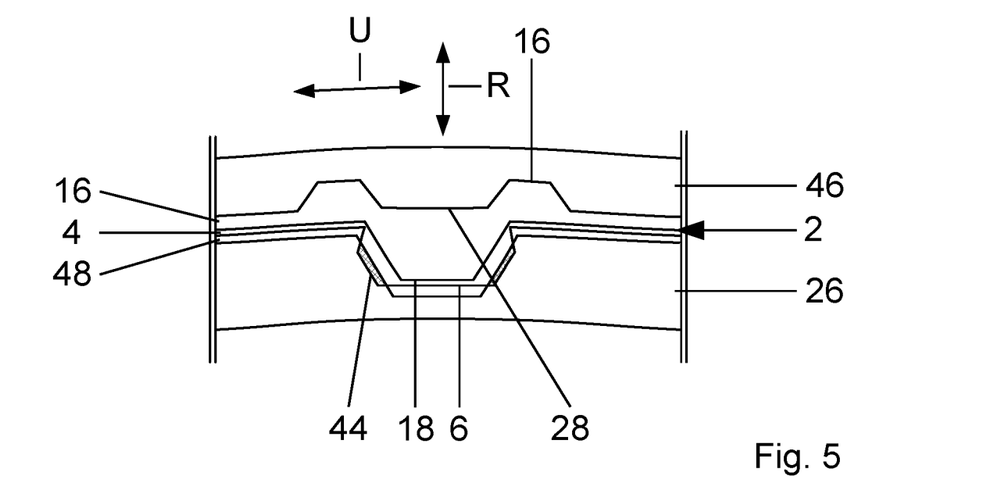

FIGS. 4 and 5 are schematically highly simplified and are intended to show further designs in principle using the example of a single shaping 6. The teeth of the hollow rim 26 on the inner circumference are hidden. In FIG. 4, the decoupling ring 2 does not comprise a carrier ring 16. The decoupling ring 2 is vulcanized to the ring gear 26 or the gear housing 46 or is arranged as a separate element by means of frictional connection and/or positive connection to the ring gear 26 and/or the gear housing 46. The cross-sectional shape of the decoupling ring 2 follows the contour of the ring gear 26 and gear housing 46, which is formed by rectangles. Cavities 48 between the decoupling ring 2 and the ring gear 26 and/or gear housing 46 are not shown, but may be provided.

FIG. 5 shows in principle the embodiment of FIGS. 1 to 3, but in a radially reversed direction. The decoupling ring 2 now has the carrier ring 16 not on the inside but on the outer circumference. Consequently, the decoupling ring 2 is pressed against the gear housing 46 via the carrier ring 16.

The invention is not limited to one of the above-described embodiments, but can be varied in many ways. All features and advantages resulting from the claims, the description and the drawing, including constructional details, spatial arrangements and process steps, can be essential to the invention both individually and in the most varied combinations.

Within the scope of the invention are all combinations of at least two of the features disclosed in the description, claims and/or figures.

In order to avoid repetition, features disclosed according to the apparatus should also be considered disclosed according to the process and be claimable. Likewise, features disclosed according to the method should be considered as disclosed according to the apparatus and be claimable.

The invention claimed is:

1. A decoupling ring for a planetary gear, comprising:
an annular elastomeric base body, and
elastomeric moldings which are uniformly spaced apart from one another, project in a radial direction from the elastomeric base body, and run parallel to a central longitudinal axis passing centrally through the decoupling ring;
wherein the elastomeric moldings include at least one press-fit surface to be press-fit against a component; on an inner circumference or outer circumference, a carrier ring is arranged on the elastomeric base body with the elastomeric moldings; and the carrier ring comprises carrier teeth; and edges of the elastomeric moldings are aligned with center portions of the carrier teeth.

2. The decoupling ring according to claim 1, wherein the elastomeric moldings comprise two press-fit surfaces.

3. The decoupling ring according to claim 2, wherein the component comprises a housing.

4. The decoupling ring according to claim 2, wherein the component comprises a ring gear.

5. The decoupling ring according to claim 2, wherein the at least one press-fit surface is disposed at an angle relative to a longitudinal center plane of the decoupling ring.

6. The decoupling ring according to claim 1, wherein the elastomeric moldings and the carrier teeth are substantially trapezoid shaped.

7. The decoupling ring according to claim 1, wherein the carrier ring is vulcanized.

8. The decoupling ring according to claim 1, wherein the carrier ring comprises outer-circumferential-side or inner-circumferential-side core teeth and/or inner-circumferential-side or outer-circumferential-side carrier teeth.

9. The decoupling ring according to claim 8, wherein a quantitative ratio of the number of core teeth to the number of carrier teeth is 1:2.

10. The decoupling ring according to claim 8, wherein an extension line of a core tooth flank of each core tooth extends through a corresponding carrier tooth.

11. The decoupling ring according to claim 8, wherein each core tooth forms a core of an elastomeric molding; and axial stop buffers are disposed on exterior surfaces of each of the core teeth.

12. An assembly for planetary gears, comprising a decoupling ring according to claim 1 and a ring gear of a planetary gear,
   wherein the decoupling ring is arranged on a circumferential side of the ring gear and/or a gear housing, and the decoupling ring is arranged on an inner circumference of the gear housing.

13. A planetary gear comprising: a decoupling ring according to claim 1, a ring gear, and a gear housing,
   wherein the decoupling ring is arranged between the ring gear and the gear housing which surrounds the ring gear on an outer circumferential side.

14. The planetary gear according to claim 13, wherein the number of moldings is an integer multiple of the number of planetary gears.

15. A decoupling ring for a planetary gear, comprising:
   an annular elastomeric base body,
   elastomeric moldings that are uniformly spaced apart from one another, project in a radial direction from the elastomeric base body, and run parallel to a central longitudinal axis passing centrally through the decoupling ring; and
   a carrier ring arranged on the elastomeric base body;
   wherein the decoupling ring is configured to be arranged on a circumferential side of a ring gear of said planetary gear; the elastomeric moldings include at least one press-fit surface to be press-fit against a component;
   wherein an elastomer thickness above a core tooth tip surface is smaller than an elastomer thickness above a core tooth flank of the same core tooth.

\* \* \* \* \*